(12) United States Patent
Arden

(10) Patent No.: US 7,012,505 B1
(45) Date of Patent: Mar. 14, 2006

(54) METHOD AND SYSTEM FOR COMMUNICATION ON A POWER DISTRIBUTION LINE

(75) Inventor: William A. Arden, Brainerd, MN (US)

(73) Assignee: Soraca, Inc., Nisswa, MN (US)

( * ) Notice: Subject to any disclaimer, the term of this patent is extended or adjusted under 35 U.S.C. 154(b) by 975 days.

(21) Appl. No.: 09/765,495

(22) Filed: Jan. 18, 2001

Related U.S. Application Data

(60) Provisional application No. 60/229,585, filed on Aug. 31, 2000.

(51) Int. Cl.
*H04M 11/04* (2006.01)

(52) U.S. Cl. .......................... 340/310.01; 340/310.02; 340/310.06

(58) Field of Classification Search ........... 340/310.01, 340/310.02, 310.06; 375/316, 317; 370/330
See application file for complete search history.

(56) References Cited

U.S. PATENT DOCUMENTS

| | | | | |
|---|---|---|---|---|
| 4,556,866 A | * | 12/1985 | Gorecki | 340/310.02 |
| 4,701,945 A | | 10/1987 | Pedigo | 379/66 |
| 4,815,106 A | * | 3/1989 | Propp et al. | 375/257 |
| H678 H | | 9/1989 | Baker et al. | 340/310.01 |
| 5,263,185 A | | 11/1993 | Bush | 455/226.3 |
| 5,581,229 A | * | 12/1996 | Hunt | 340/310.02 |
| 6,278,357 B1 | * | 8/2001 | Croushore et al. | 340/310.01 |
| 6,329,905 B1 | * | 12/2001 | Cunningham | 340/310.01 |
| 6,407,987 B1 | * | 6/2002 | Abraham | 370/295 |
| 6,549,120 B1 | * | 4/2003 | de Buda | 340/310.01 |
| 6,608,552 B1 | * | 8/2003 | Fogel et al. | 340/310.01 |
| 6,671,501 B1 | * | 12/2003 | Dalichau | 455/120 |

* cited by examiner

*Primary Examiner*—Toan N. Pham
(74) *Attorney, Agent, or Firm*—Schwegman, Lundberg, Woessner & Kluth, P.A.

(57) ABSTRACT

A method and system of communicating on an active power distribution line using numerous asynchronous data transmitters. Data is modulated onto 5 KHz carrier signals of narrow bandwidth whose frequency is numerically derived from the power line frequency. The carriers are frequency division multiplexed and data is recovered by demodulating the data from the carriers.

19 Claims, 9 Drawing Sheets

US 7,012,505 B1

METHOD AND SYSTEM FOR COMMUNICATION ON A POWER DISTRIBUTION LINE

This application claims the benefit of Provisional Application No. 60/229,585, filed Aug. 31, 2000.

TECHNICAL FIELD

The technical field relates generally to communication systems. More particularly, it pertains to providing a communication on power lines transmitting power at a power line frequency.

BACKGROUND

Communication of information over a power line is useful in a number of situations. In order to do so, individual transmitters and receivers associated with them may be placed at varying locations along a power line to send and receive data. For example, it may be desired to transmit power consumption data from each of the users to a central station. In other examples, it may be desired to send signals from a central location to individual users for load control or other applications.

A number of systems have been proposed for communicating over AC power lines in the past. All of the systems must cope with the fact that AC power lines are usually noisy and are already connected to various control and other devices capable of affecting the proper operation of a communication system. It is also necessary to have a system that allows for the simultaneous communication of a plurality of signals to and from a multitude of users.

In some power line communication systems an input signal is converted to a frequency by a voltage to frequency converter and the output of the voltage to frequency converter is used by an FM transmitter to modulate a carrier signal which is then transmitted over the power line. Such a system requires two stages of modulation. Such a system may provide a 1 to 6 KHz varying frequency at the V/F converter and a carrier of about 200 KHz at the output of the FM transmitter. Such high frequency carrier signals are not capable of passing through power line transformers and thereby are limited in their utility for applications requiring communication between a central station and users through transformers.

In other power line communications systems, two stages of modulation are provided to a signal provided by a data source having a very low bandwidth but the carrier frequency provided by the second stage of modulation is less than 10 KHz. Such systems however, have still required two modulation steps to achieve the signal to be transmitted on the power line because the previous modulation techniques employed were incapable of producing, through a single modulation step, narrow bandwidth carriers at higher frequencies.

To provide a reliable communication system, for transmission of very low bandwidth information, there is a need for a transmission system where a single modulation step provides a highly stable low bandwidth communication signal suitable for communication via power lines carrying AC power.

DETAILED DESCRIPTION

Figure 1:
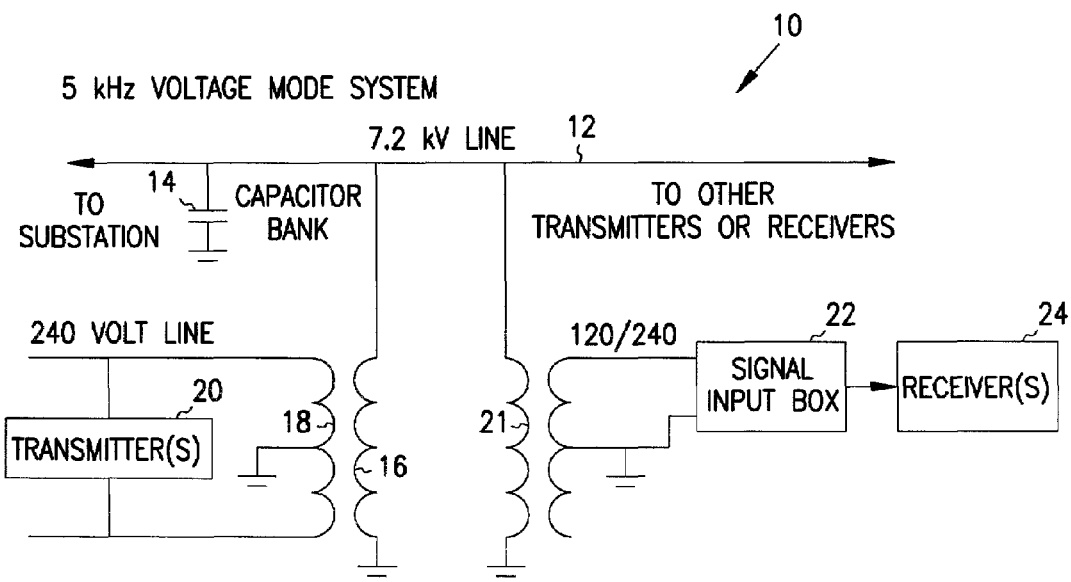
FIG. 1 is a functional diagram of a multipoint data communication system for use over a power line carrying AC power.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

The embodiments of the invention focus on facilitating communication over power lines delivering AC power. The embodiments of the invention facilitate the creation of communication signals for transmission over power lines and for sending and receiving such signals. This system and method provides for the creation of a communication signal which is well adapted for power line transmission with a single modulation step without creation of an intermediate subcarrier signal.

FIG. 1 is a block diagram of an embodiment of a multipoint data transmission system 10 in accordance with the present invention. An alternating current power 7.2 kV distribution line 12 is shown which may, in some embodiments, comprise three conductors carrying three phase electrical power. One end of power line 12 may connect to power providing apparatus at a substation and the other end connects to further power consuming devices which are not shown. Capacitor banks 14 may exist on power line 12 for power factor correction. A first transformer 16 is connected to power line 12 and has a secondary winding 18 which, in one embodiment, provides 240 volt line power. A power line communication transmitter 20 may be connected across secondary winding 18 of transformer 16. A further transformer 21, which may be located remotely from transformer 16, is accessed by a signal input box 22 which is in turn connected to a power line communications receiver 24.

Figure 2:
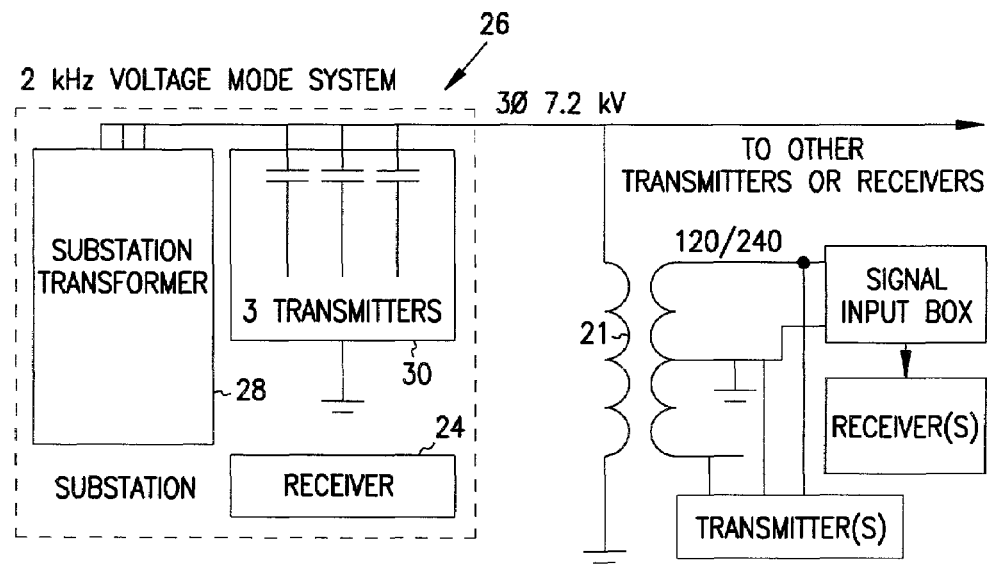
FIG. 2 is a functional diagram of a substation transmission system.

FIG. 2 is a block diagram of a substation based communications system 26. A substation transformer 28 is connected to a transmitter module 30 containing three power line communications transmitters, one for each phase of the power line. Each of the individual substation transmitters can be configured to transmit information independently from the other two transmitters, although doing so would require keeping track of which phase of the transmission line is connected to a particular receiver with which communication is intended. In practice it is easier to transmit the same signal on each phase of the transmission line. The phase of the signals generated by the three transmitters are shifted 120 degrees from each other so that the signal can be received from either Y connected or delta connected pole transformers.

Receiver 24 in FIG. 2 monitors both the current and the voltage of each phase of the substation.

Figure 3:
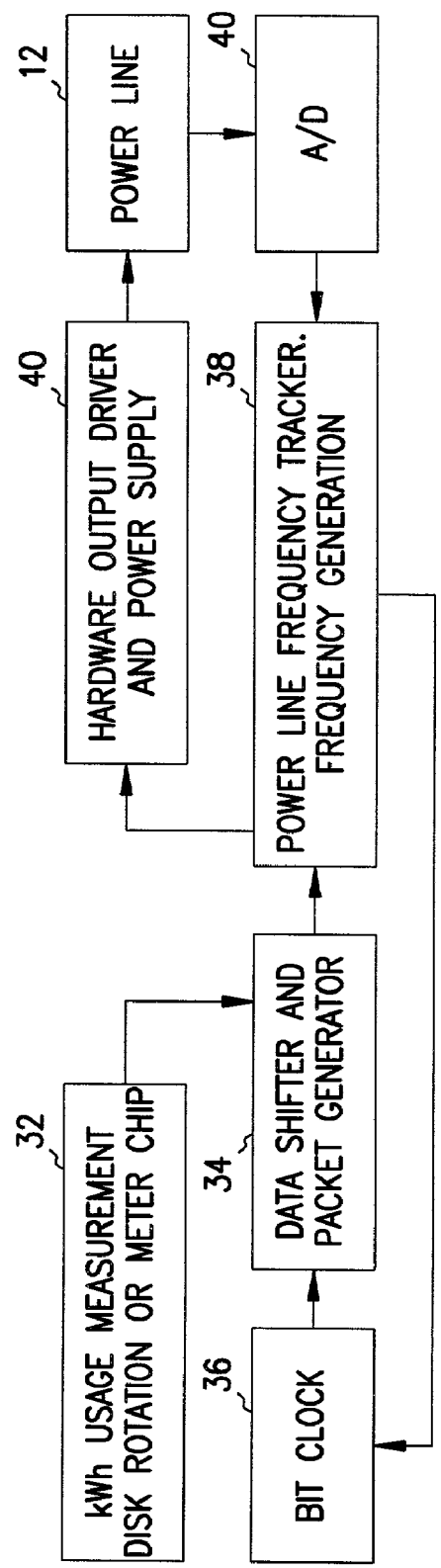
FIG. 3 is a data flow block diagram of the transmitter in FIGS. 1 and 2.

FIG. 3 is a data flow block diagram of an embodiment of a single channel transmitter 20 of the type shown in FIGS. 1 and 2. In various communications systems constructed in accordance with the present invention the information communicated in the system may come from a variety of sources. In one embodiment, a transducer such as an optical interrupter or a disk reflective recorder 32 may be used to measure disk rotation in a power usage meter or other device. In another embodiment, suitable sensors may provide temperature or security information. In some cases a modem, not shown, receives the information for transmission over the power line from a remote source.

Information from transducer 32 is delivered to a data shifter and packet generator 34 which, in response to timing generated by a bit clock 36, converts the information to be transmitted into data packets. In another embodiment, a standard synchronous protocol, such as the HDLC (High-level Data Link Control) protocol specified in ISO 3309-1979 [2], is used. In the HDLC embodiment the packet is commenced by the transmission of at least six "1"s followed by a zero and then the first byte of information is transmitted. A zero is inserted after five consecutive "1"s as called for in the protocol. A CRC coding scheme is utilize to make sure that only good packets are accepted.

Figure 4:
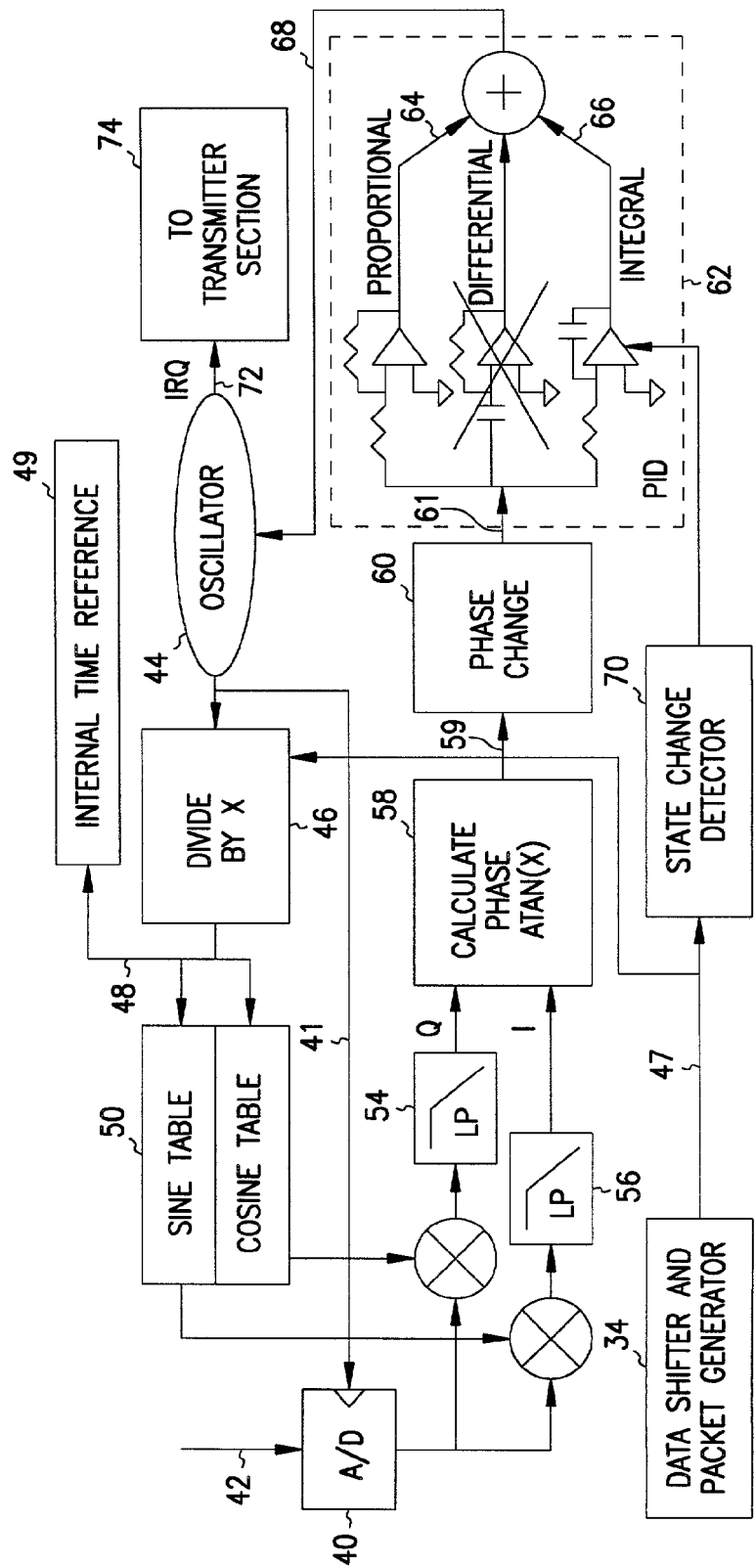
FIG. 4 is a block diagram of the Transmitter Power line frequency tracker of FIG. 3.

The packets from generator 34 are passed to a power line frequency tracker circuit 38 which is shown in more detail in FIG. 4. Frequency tracker 38 is responsible for generating the high frequency signal coupled to power line 12 by output driver 40 and also generates the clock signal for bit clock 36. The power line carrier signal from power line 12 is an input to power line frequency tracker 38. An A/D converter 40 is shown separately in FIG. 3 receiving the power carrier signal from power line 12 and delivering an output signal to the remainder of power line tracker 40. A more detailed functional block diagram of frequency tracker 38 and its related components is shown in FIG. 4.

Power line frequency tracker 38 converts the packet data generated by packet generator 34 into the sequence of mark and space frequencies used in a frequency shift keying system to represent the information for transmission over the power line. The coding in the packet generator is non-return to zero coding so that the sequence of space and mark frequencies remains at the space or mark frequency during transmission of long strings of "1"s or "0"s. In another embodiment, the coding in packet generator 34 is non-return to zero invert coding so that the sequence of space and mark frequencies changes every time a "1" is sent. The mark and the space frequencies are derived from the power line carrier by the power line frequency tracker 38. Each transmitter sends its information over power line 12 at space and mark frequencies which differ slightly from those employed in each of the other transmitters operating in the system.

Although it is possible to transmit information over power lines at a wide range of frequencies, certain frequencies have distinct operating advantages over others. For example, it is known that the distance that a transmitted signal travels is dependent upon the frequency which is sent, the transmitted power and the bandwidth of the signal. Signals having frequencies below 5 kHz can travel through capacitor banks. Signals employing frequencies between 5 kHz and 10 kHz will travel through transformers but are greatly attenuated at power correction factor correction capacitor banks. Signal frequencies above 10 kHz will not travel through pole transformers.

For the above and other reasons it has been determined that the 5 kHz band facilitates propagation of signals onto the power line in the voltage mode through transformers. The band below 2 kHz is most easily transmitted in the current mode. It appears that the most suitable transmission frequencies are clustered around the prime number harmonics of the power line second harmonic because there is less noise at the prime harmonic than at other locations. Thus in one embodiment selection of the $43^{rd}$ harmonic of 60 Hz power results in a carrier of 5160+/−60 Hz.

In short, the power line frequency tracker circuit of FIG. 4 operates by utilizing an oscillator in a frequency locked loop which compares the frequency difference between an internal reference signal generated within frequency tracker 38 and the power line frequency and generates an output signal which has a frequency which is a non-integer multiple of the internal reference frequency. Additionally, the frequency tracker circuit generates an internal time reference for bit clock 36 which controls the timing of packet generator 34.

In FIG. 4 A/D converter 40 receives an input signal 42 which is representative of the power line frequency. A/D converter 40 samples the power line frequency at a sampling rate which is determined by output 41 of voltage controlled oscillator 44 which operates at a nominal 5 kHz frequency. The output of A/D converter 40 is mixed with the modified output of oscillator 44 which is divided by a constant X in a divider block 46 which generates either the space or the mark frequency at which the transmitter is intended to operate. The signal 47 indicating whether it is the space or the mark frequency that is being generated at any particular time is provided to divider 46 by packet generator 34. The output 48 of divider 46 is scaled down to the nominal 60 Hz frequency of the internal time reference 49 which is used to control the timing of the bit clock in FIG. 3.

The internal time reference 49 at the output of divider block 46 is also provided to sine and cosine tables 50, 52 which have their outputs mixed with the output of A/D converter 40 to define a vector that represents the phase difference between the internally generated reference signal and the power line frequency. The quadrature and in phase magnitude components of the phase vector are put through low pass filters 54, 56 to remove noise. A phase calculation is performed by an arctangent circuit 58 which outputs the instantaneous phase difference 59 between the reference and the carrier at each measuring interval. A phase change calculation block 60 compares the present phase difference with the previous measurements to provide an indication of the change in phase occurring during a time increment. A circular code is used to represent the phase change so that the output is a signed number ranging from −180 to +180.

An output 61 of phase calculator 60 is coupled to a proportional plus integral and differential or PID unit 62 which receives the change in phase as an input signal and provides an output signal 68 as the signal for controlling the frequency of oscillator 44. As shown in FIG. 4, the differential integral path is not used in PID 62 so that the phase change from block 60 passes through the proportional path 64 of PID 62 where it is summed with the signal passed through integral path 66 and an error signal 68 is provided to oscillator 44. Since the loop is primarily closed on the change in phase of the 60 HZ rather than on the phase itself, the system operates as a frequency lock loop rather than a phase lock loop.

The PID signal 68 to the oscillator 44 is preloaded at startup and in one embodiment is limited to a working range between 45 Hz and 65 Hz. The divider constants are set each time there is a switch from space to mark frequency and back. A state change detector 70 monitors the output of data shifter and packet generator 34 and detects when the carrier changes state to add or subtract a constant from the integral part of the PID 62. The proportional portion of the PID signal 68 is used to dampen oscillations in the closed frequency loop and to control the settling of the system in a selected period of time.

Figure 5:
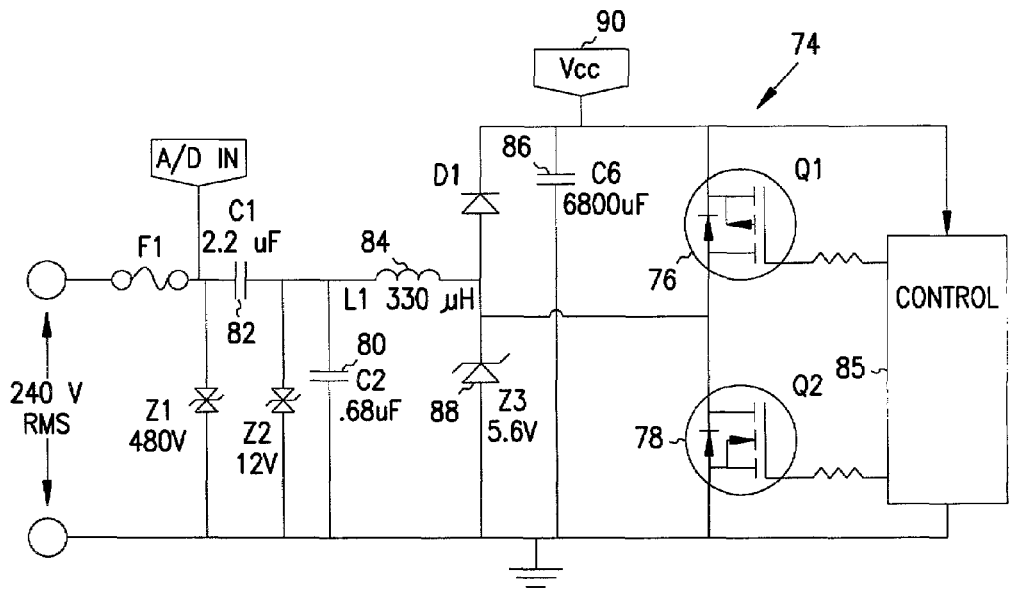
FIG. 5 is a schematic of the multipoint transmitter and power supply of FIG. 3.
Figure 6:
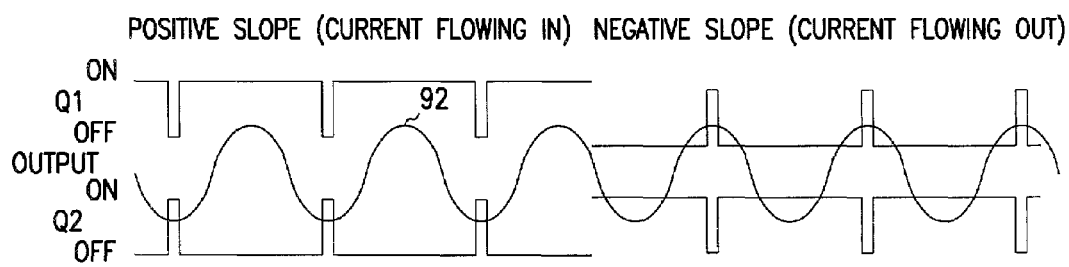
FIG. 6 is a diagram showing the output switch waveform.

An output 72 of oscillator 44 is coupled to a transmitter and power supply module 74 shown in more detail in FIG. 5. In one embodiment the oscillator output 44 may be the interrupt IRQ which is generated once per cycle of the oscillator. Transmitter module 74 uses mosfets 76 and 78 to switch currents in a resonant circuit comprised of capacitors 80 and 82 and inductor 84. FIG. 6 is a representation of the waveforms of switches 76 and 78 showing the coordination of the operation of transistors 76 and 78 relative to each other and also shows how the switching pattern for switches 76 and 78 changes depending upon whether the 60 Hz power line carrier has a positive slope or a negative slope. The duty cycle of the ON times of the mosfets 76 and 78 are varied by control circuitry 85 to control the voltage to which large storage capacitor 86 is allowed to charge while zener diode 88 puts a limit on the maximum voltage of the five volt supply 90. The sinusoidal waveform 92 is the waveform of the voltage signal applied by transmitter 74 to power line 12 as a result of the operation of the switches 76 and 78 in response to the interrupt signals 72 of oscillator 44.

Figure 7:
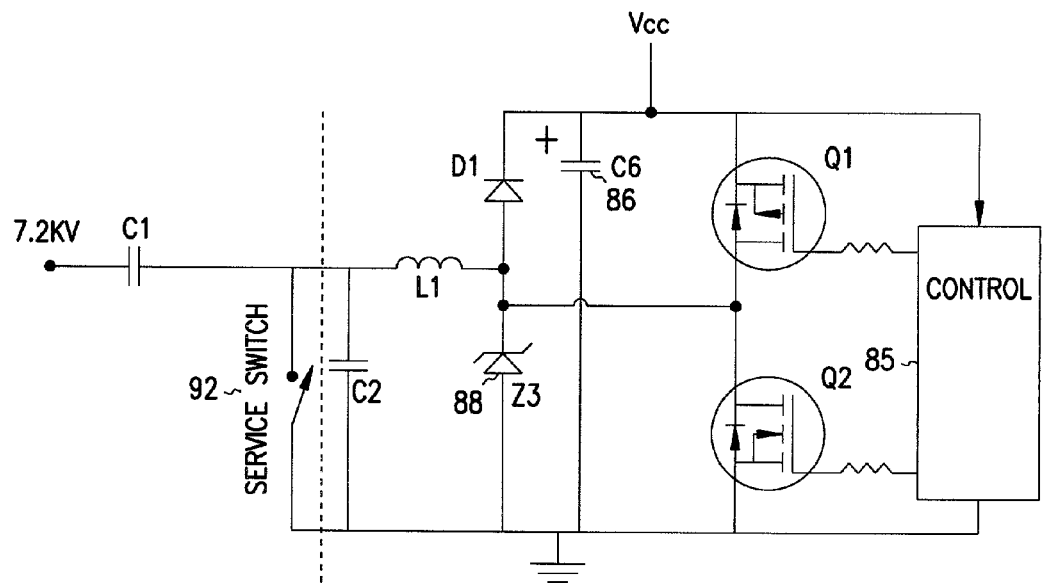
FIG. 7 is a schematic diagram showing aspects of the transmitter and power supply of FIG. 3.

An embodiment of one of the three transmitters of transmitter and power supply module 40 of FIG. 3 is shown in FIG. 7 which shows a transmitter and power supply adapted for substation use. The unit generally operates in a manner similar to that shown in FIG. 5. Zener diode 88 limits the maximum voltage across capacitor 86 until controller 85 assumes control of the voltage by altering the pulse width of the pulses of the waveforms switched by mosfets 76 and 78. A service switch 92 is used to turn the transmitter off.

The substation transmitter could also use a lower voltage capacitor and a step up transformer (not shown) to couple the signal onto the substation bus.

Figure 8:
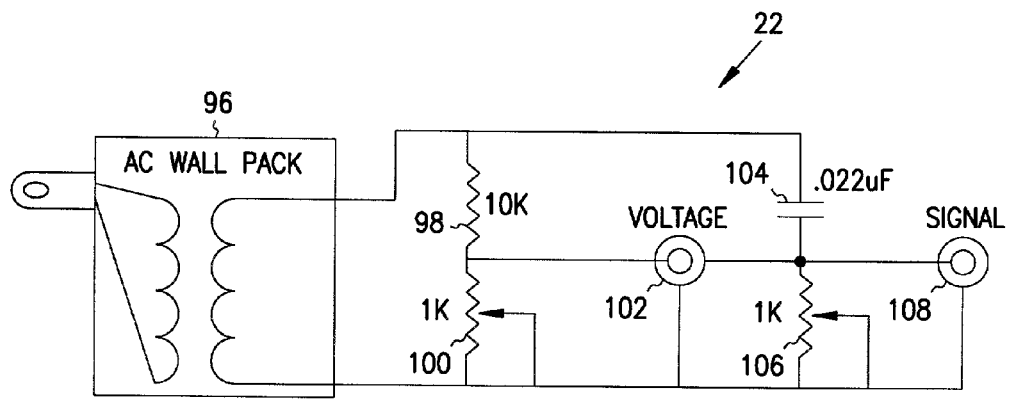
FIG. 8 is a schematic diagram of an embodiment of a voltage mode signal input box of FIG. 1.

The details of the voltage mode signal box 22 as shown in block diagram in FIG. 1 are illustrated in more detail in FIG. 8. In the signal input box 22 of FIG. 8 an AC wall pack transformer 96 is plugged into the AC power line 12. The power line voltage is divided down by a divider comprised of a resistor 98 and a variable resistor 100. The output is connected to a jack 102 for providing it to the receiver in FIG. 9. A further divider of a capacitor 104 and a variable resistor 106 also provides a representation of the transmitted signal at jack 108 for use as the input signal in power line frequency tracker 38 of the transmitter 20 of FIGS. 3 and 4.

Figure 9:
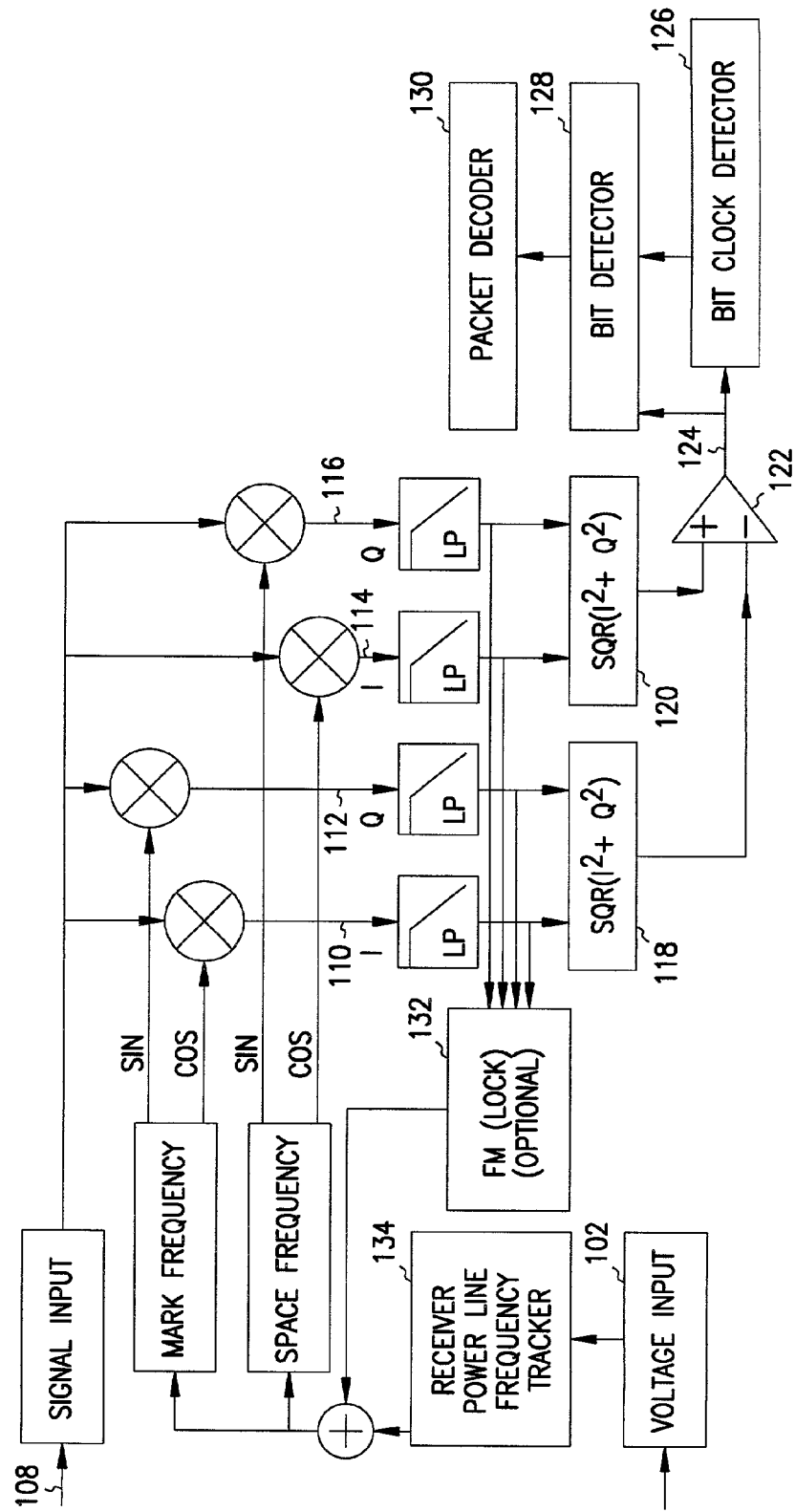
FIG. 9 is a data flow block diagram of a single channel receiver for use in the systems of FIG. 1 or 2.

The transmitted information may be recovered using the receiver of FIG. 9. It performs direct quadrature down conversion of the signal from transmission line 12 by a single channel receiver 24 which is shown in a more detailed receiver data flow block diagram of FIG. 9. In the flow diagram of FIG. 9 the input signal 108 from the signal input box of FIG. 8 is mixed with the sine and cosine of the mark and space frequencies for the particular channel. In mark paths 110 and 112 the mixed output, a vector that represents the frequency difference between the mark frequency and the input frequency, is then sent to a low pass filter which is set to settle in one bit time. The low pass is set to not pass most of the space frequency so that when a space frequency is being received, the vector will be smaller than it is when it is transmitting a mark frequency. Similarly, space paths 114 and 116 handle the space frequency in a manner similar to the handling of the mark frequency. The amplitude of the mark and space vectors is calculated by amplitude computation blocks 118 and 120 and their outputs are compared by comparator 122 to create a data signal 124. A bit clock detector 126 watches for transitions of data signal 124 and on each transition adds to or subtracts from the phase depending upon the direction of the error. The sensed changes in the data signal 124 are input to the bit detector 128 which checks the data signal to determine if it has changed state. If it has, it sends a "1" to a packet decoder 130. If it has not, it sends a "0" to packet decoder 130.

Packet decoder 130 also comprises a counter and a state machine. The counter looks for the sequence of 6 "1"s in a row and if detected, it will set the state machine to "0". The state machine clocks data bytes into the buffer and looks for a "0" between bytes. If it sees 6 "1"s after a byte, it checks the packet length and CRC to see if the received packet is valid.

In one embodiment, a separate FM lock 132 can be implemented to measure the direction of phase change of the larger of the mark and space vectors and sums that number with the output of the receiver frequency tracker circuit 134. The gain of the frequency lock is limited to prevent it from locking on to an adjoining channel or the other frequency (mark or space).

Figure 10:
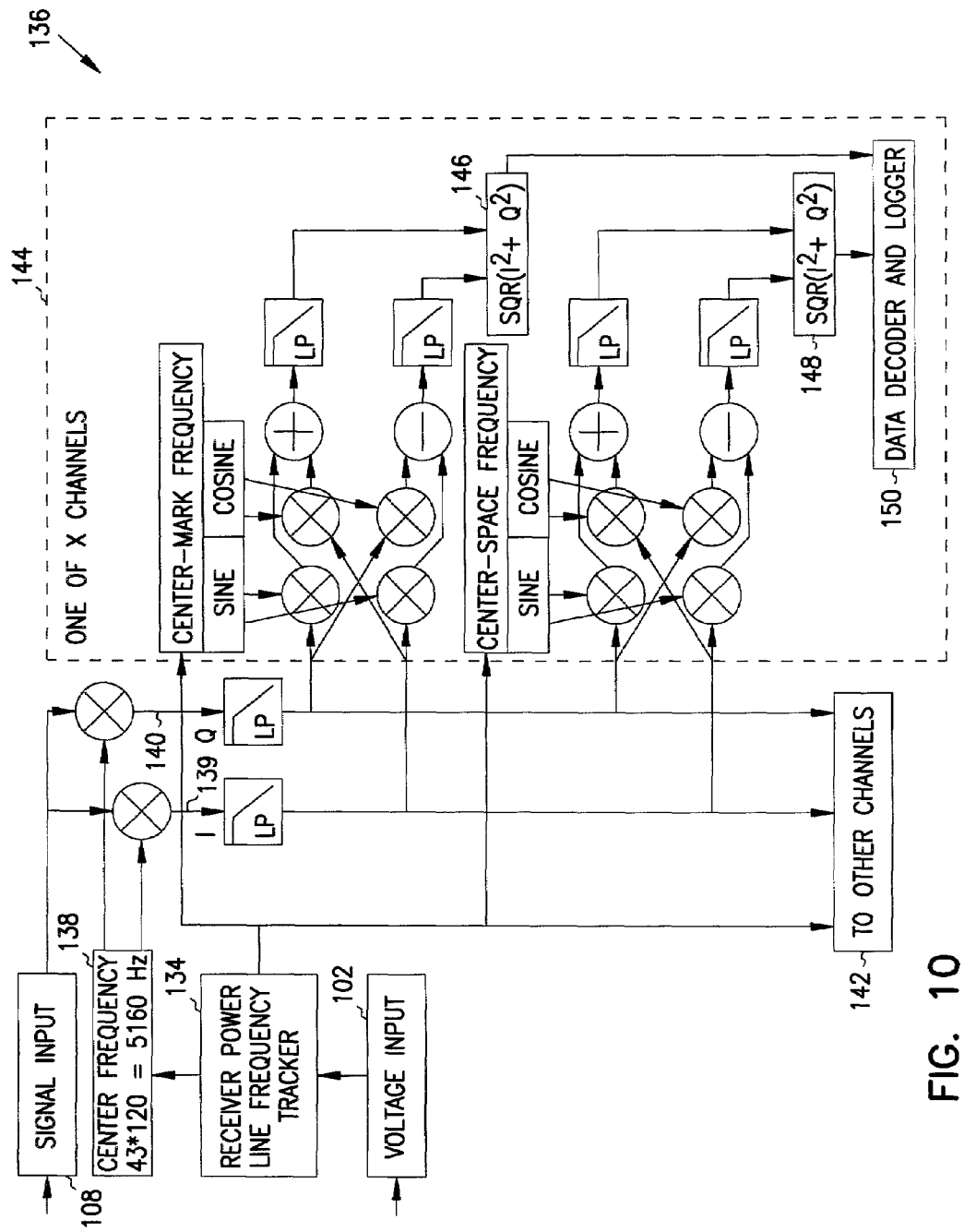
FIG. 10 is a data flow block diagram of a multi channel receiver for use in the systems of FIG. 1 or 2 with code optimizations.

FIG. 10 is a data flow block diagram of a multichannel receiver 136 for use in the systems of FIG. 1 or FIG. 2 with code optimization. In multichannel receiver 136 the signal input 108 is summed with a center frequency signal 138 in the middle of the band of signals carried on the multiple channels incorporated in the receiver. The center frequency signal 138 is received from receiver power line frequency tracker 134 which numerically derives it from the power line voltage signal 102 from signal input box 22. The outputs 139 and 140 represent a vector that contains the signals that are shifted either positively or negatively from the center frequency. Vector signals 139 and 140 are low passed to limit their bandwidth and then delivered to the channel decoders 142, one embodiment of which 144 is shown in FIG. 10.

In channel decoder 144 center mark and center space frequency reference signals 146 directly numerically derived from the power line carrier by receiver power line frequency tracker 134 carrier are provided. The sine and cosine transformations of the center mark and space frequencies are vector multiplied with the low passed I and Q signals representing the vector containing signals that are either positive or negative from the center frequency. The channel decoders 142 mix the signal to create dot product and cross product signals to perform a multiplication of the vectors in what is equivalent to a single mixing stage. The amplitude computation circuits 146 and 148 and data decoder and logger operate in the same manner as similar circuitry illustrated in FIG. 9.

Figure 11:
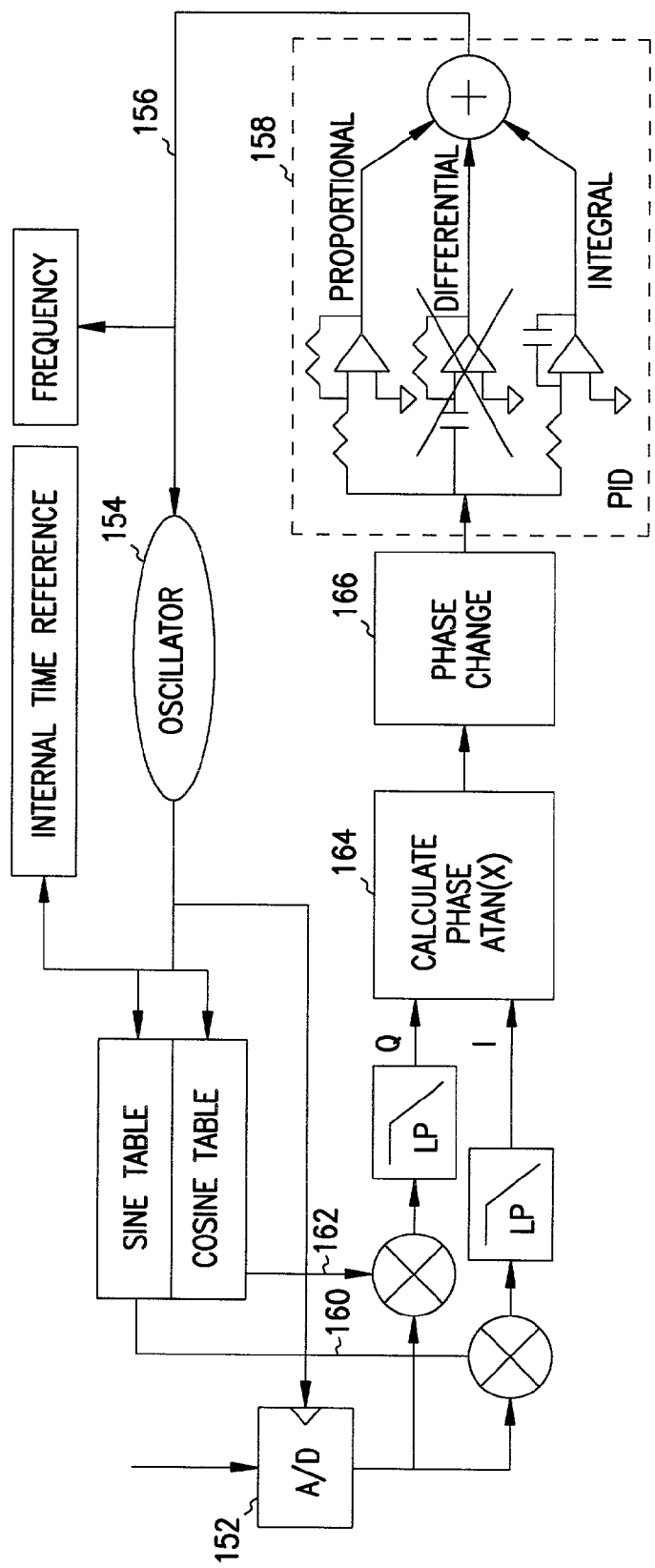
FIG. 11 is a block diagram of the Receiver Power line frequency tracker for use in the receivers of FIG. 9 or 10.

Finally, FIG. 11 is a block diagram of the receiver power line frequency tracker which is shown in more detail than appears in FIGS. 9 and 10. It operates in a manner very similar to the transmitter power line frequency tracker of FIG. 4. In one embodiment a receiver A/D 152 is optionally clocked by an oscillator 154 to run at a fixed rate of 44.1 kHz. For each cycle of A/D 152 an output 156 of a PID 158 is added to an accumulator that represents the phase of oscillator 154. The oscillator phase is then used to create sine and cosine signals representative of a vector which are mixed with the output of A/D 152 and low passed to create a vector representative of the phase 164. The change in phase 166 is input to PID 158. The constants of PID 158 are adjusted to take into account the frequency of the transmitted frequency and the output of PID 158 is the frequency of the power line 12. In one embodiment, the output of PID 158 may be multiplied by any number to control oscillator 154 for operation at any necessary frequency.

Figure 12:
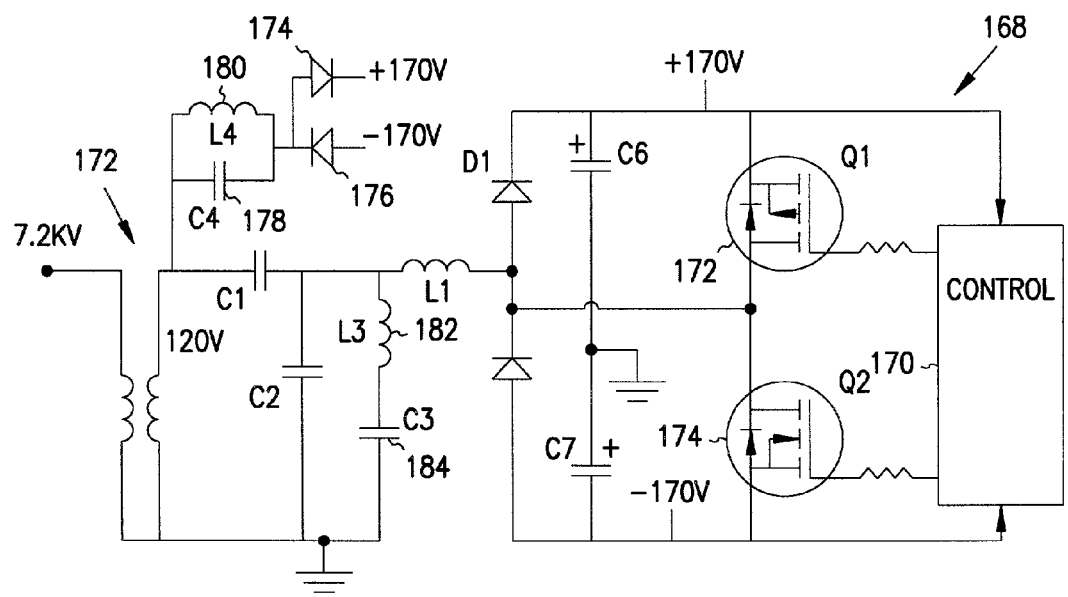
FIG. 12 is a schematic diagram of a basic substation transmitter and power supply of FIG. 3.

FIG. 12 is a schematic diagram of a basic substation transmitter and power supply 168. It operates similarly to the transmitter shown in block diagram form in FIG. 3. Control circuitry 170 drives transistors 172 and 174 to create a PWM modulated output signal which is applied to the power line through pole transformer 172. In one embodiment three 10Kva pole transformers are connected to a 7.2 Kv three phase power line to provide 208 volts Y which are equivalent to providing 120 V to ground. The 120 V from transformer 172 is rectified by diodes 174, 176 to create DC voltages + and −170 V which are shared by the three transmitters that are utilized. Capacitor 178 and inductor 180 are used to prevent the power supply from distorting the output signal. In one embodiment the resonant frequency of capacitors $L_4$ and $C_4$ is set to be resonant at the transmitted frequency.

The PWM signal produced by the switching action of transistors 172 and 174 is used to drive the resonant circuit comprised of L1, C1, C2 and the inductance of pole transformer 172. Inductance L3 and capacitor C3 184 filter out the PWM frequency.

In one embodiment C1 can be removed if control 170 compensates for the 60 Hz waveform applied on Q1 and Q2. In that instance control 170 would measure the input voltage waveform and alter the PWM duty cycle to both transmit power and up convert energy into the power supply capacitors C6b and C7 which would then charge to the voltage, above 170 volts, set by control system 170.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the electrical, computer and telecommunication arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

I claim:

1. A method of transmitting a signal on a power line at transmission frequencies numerically derived from the power line frequency, comprising:

selecting a transmission frequency for the signal;

setting a voltage controlled oscillator to a preset frequency determined by the transmission frequency;

dividing the oscillator output by the transmission frequency to derive an internal reference signal;

comparing the phase of the internal reference signal to the phase of the power line carrier and using the changes in phase angle as a feedback signal in a frequency lock loop for maintaining the oscillator at the transmission frequency; and transmitting a signal on the power line using an output stage driven at the transmission frequency.

2. The method of claim 1 wherein the signal is a frequency shift key signal comprised of a sequence of space frequency and mark frequency pulses.

3. A method of transmitting a modulated data signal on a power line at frequencies numerically derived from the power line frequency, comprising:

selecting a mark frequency and a space frequency for the "1"s and "0"s of the data represented by the signal;

starting a voltage controlled oscillator at a preset frequency determined by whether the mark frequency or the space frequency is being transmitted;

dividing the oscillator output by either the mark frequency or the space frequency, depending upon which is being transmitted, to provide an internal reference signal; and comparing the phase of the internal reference signal to the phase of the power line carrier and providing the changes in phase as a feedback signal in a frequency lock feedback loop to control the frequency of the oscillator.

4. A transmitter for sending data on a power distribution line having a power line frequency, comprising:

a bit clock;

a data shifter and packet generator for receiving data for transmission and converting it into packets containing a plurality of data bytes transmitted in response to the output of a bit clock;

an A/D converter coupled to receive a signal from the power line at the power line frequency, the A/D converter coupled for delivering an output signal;

a power line frequency tracker circuit coupled to receive an output signal from the A/D converter and packets from the data shifter and packet generator, the tracker circuit comprising an oscillator circuit constructed and arranged for operating at a mark frequency derived from the power line carrier for "1"s and at a space frequency derived from the power line carrier for "0"s, the oscillator circuit operating as a phase lock loop circuit comparing the phase difference between a reference signal generated in the tracker circuit and the power line frequency and generating an output signal containing mark and space frequency components, the tracker circuit also delivering an internal time reference for the bit clock; and a transmitter for coupling the output of the oscillator to the power line for transmission of the mark and space frequency signals having a bandwidth less than ten Hertz on the power line.

5. The invention of claim 4 wherein the data shifter and packet generator encodes the data for transmission in packets according to a HDLC protocol with each packet preceded by at least six bits of "1"s followed by a "0" and each sequence of five or six "1"s have a extra "0" inserted.

6. The invention of claim 4 wherein the data transmitted is in non-return to zero format.

7. The invention of claim 4 wherein the data transmitted is in NRZI format.

8. A power line distribution communications system for transmitting selected information on an electric power distribution line transmitting power at a selected power frequency, the power line distribution communications system comprising:
  a. a transmitter coupled to the electric power distribution line comprising:
    an information signal generator providing an information signal;
    a first reference circuit for detecting a power frequency of an alternating current transmitted on the electric power distribution line; and
    a modulator connected to the information signal generator for taking the information signal as an input for modulation of a carrier signal, the modulator being operably connected to the first reference circuit such that the carrier signal has a frequency derived from and numerically referenced to the detected power frequency and a bandwidth of less than ten Hertz; and
  b. a receiver coupled to the electric power distribution line and comprising:
    a second reference circuit for detecting the power frequency of the alternating current transmitted on the electric power distribution line and providing a reference signal indicative of the detected power frequency; and
    means for demodulating the carrier signal from the output carrier signal.

9. A method of communicating data over a power line which transmits power at a power line frequency, the method comprising:
  converting the data to a series of pulses;
  converting the pulses into a frequency division multiplexed signal having a carrier frequency which is numerically derived from the power line frequency and a bandwidth of less than ten Hertz; and
  coupling the frequency division multiplexed signal on the power line.

10. The method of claim 9 wherein the input is converted into space and mark frequencies.

11. The method of claim 9 wherein the carrier frequency is selected to fall between the harmonics of the power line frequency.

12. The method of claim 9 wherein the transmitting of the signal onto the power line is done in voltage mode.

13. The method of claim 12 wherein the carrier frequency is about approximately 5 kHz.

14. The method of claim 9 wherein the transmitting of the signal onto the power line is in current mode.

15. The method of claim 14 wherein the carrier frequency is about approximately 2 KHz.

16. The method of claim 9 wherein the series of pulses are arranged in packets by a data shifter and packet generator which is clocked by a bit clock driven by a reference at the power line frequency.

17. The method of claim 9 wherein the packets are HDLC packets.

18. The method of claim 17 wherein the packets are coupled to a power line frequency tracker which is also coupled to the power line frequency, the power line frequency tracker comprising an oscillator constructed and arranged for generating an internal reference signal and comprising circuitry for calculating the changes in phase between the internal reference signal and the power line frequency for use as an error signal for driving the voltage controlled oscillator.

19. A receiver coupled to a distribution line carrying power at a power line frequency and a bandwidth of less than ten Hertz for receiving data therefrom as a data signal coded in packets of bytes which are comprised of sequences of mark or a space frequency signals to which the receiver is tuned, the receiver comprising:
  a power line frequency tracker coupled to receive an input signal representative of the power line frequency and generate output frequencies representative of the mark and space frequencies to which the receiver is tuned;
  a mixer circuit for mixing the sine and cosine of the pulse and mark frequencies generated by the power line frequency tracker and the data signal and producing a vector representing the frequency difference between the mark frequency and the data signal;
  a comparison circuit for comparing the vectors and creating a data stream signal; and
  a decoder circuit receiving the data stream and producing an output representing the data.

* * * * *